US011607643B2

United States Patent
Mohandas et al.

(10) Patent No.: US 11,607,643 B2
(45) Date of Patent: Mar. 21, 2023

(54) PURIFICATION OF GASES CONTAINING SULFUR COMPOUNDS

(71) Applicant: Saudi Arabian Oil Company, Dhahran (SA)

(72) Inventors: Subindas M. Mohandas, Dammam (SA); Saeed A. Salah, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/688,164

(22) Filed: Mar. 7, 2022

(65) Prior Publication Data

US 2022/0184548 A1 Jun. 16, 2022

Related U.S. Application Data

(63) Continuation of application No. 16/413,367, filed on May 15, 2019, now Pat. No. 11,266,946.

(Continued)

(51) Int. Cl.
*B01D 53/14* (2006.01)
*B01D 53/86* (2006.01)
*B01J 20/28* (2006.01)

(52) U.S. Cl.
CPC ..... *B01D 53/1481* (2013.01); *B01D 53/8609* (2013.01); *B01J 20/28045* (2013.01); *B01D 2256/24* (2013.01); *B01D 2257/302* (2013.01)

(58) Field of Classification Search
CPC ............ B01D 53/1481; B01D 53/8609; B01D 2256/24; B01D 2257/302; B01D 53/504;

(Continued)

(56) References Cited

U.S. PATENT DOCUMENTS 3,607,033 A 9/1971 Shah
4,303,633 A 12/1981 Thomsen
(Continued)

FOREIGN PATENT DOCUMENTS

CN 1196031 10/1998
CN 102481515 5/2012
(Continued)

OTHER PUBLICATIONS

GCC Examination Report in GCC Appln, No. GC 2019-037587, dated Jun. 2, 2020, 3 pages.

(Continued)

*Primary Examiner* — Timothy C Vanoy
(74) *Attorney, Agent, or Firm* — Fish & Richardson P.C.

(57) ABSTRACT

A system includes a purification unit configured to process a vapor stream including sulfur dioxide. The purification unit includes an inlet configured to allow the vapor stream to enter the purification unit. The purification unit includes a steam coil configured to circulate steam and provide a source of heat. The purification unit includes a packed bed. The purification unit includes a tray configured to accumulate sulfur. The purification unit includes an absorber section configured to remove at least a portion of the sulfur dioxide from the vapor stream. The purification unit includes an outlet configured to allow an effluent with a lower sulfur dioxide content than the vapor stream to exit the purification unit. The system includes a sulfur tank including a vent line in fluid communication with the inlet. The vent line is configured to allow vapor to flow from the sulfur tank to the purification unit.

13 Claims, 3 Drawing Sheets

Related U.S. Application Data

(60) Provisional application No. 62/672,301, filed on May 16, 2018.

(58) Field of Classification Search
CPC ... B01D 53/82; B01J 20/28045; B01J 8/0285; B01J 8/0292; B01J 8/04; B01J 19/24; B01J 2219/00761
See application file for complete search history.

(56) References Cited

U.S. PATENT DOCUMENTS

| | | | |
|---|---|---|---|
| 5,340,383 | A | 8/1994 | Womack |
| 8,440,160 | B1 | 5/2013 | Rameslmi et al. |
| 8,702,842 | B2 | 4/2014 | Fraser et al. |
| 8,871,176 | B2 | 10/2014 | Liu et al. |
| 11,266,946 | B2* | 3/2022 | Mohandas ......... B01D 19/0073 |
| 2011/0232328 | A1* | 9/2011 | Johnke ............. F25J 3/0242 62/620 |
| 2014/0140913 | A1* | 5/2014 | Suchak ............. B01D 53/507 423/210 |
| 2014/0344392 | A1 | 11/2014 | Ozawa |
| 2018/0058754 | A1* | 3/2018 | Lynch ............. F25J 3/0209 |
| 2020/0039825 | A1* | 2/2020 | Rameshni ......... B01D 53/1418 |
| 2021/0031136 | A1* | 2/2021 | Fujita ............. B01D 53/1425 |

FOREIGN PATENT DOCUMENTS

| | | |
|---|---|---|
| CN | 104474850 | 4/2015 |
| CN | 204369566 | 6/2015 |
| CN | 204746071 | 11/2015 |
| CN | 205253071 | 5/2016 |
| WO | WO 2016142018 | 9/2016 |

OTHER PUBLICATIONS

GCC Examination Report in GCC Appln, No. GC 2019-037587, dated Oct. 5, 2020, 3 pages.
GCC Examination Report in GCC Appln, No. GC 2019-037587, dated Feb. 9, 2021, 3 pages.
CN Office Action in Chinese Appln. No. 201980047282.1, dated May 14, 2021, 14 pages, with English Translation.
Adams, "Sulfur-Recovery Solutions for Small-Scale Petchem Processing," Hydrocarbon Processing, Sulfur Supplement, Oct. 2013, 3 pages.
McIntush et al., "Molten Sulfur Storage Tank, Loading, and Vapor Ejection Systems Review," Cameo short paper, Brimstone Sulfur Symposium, Vail, Colorado, Sep. 2015, 15 pages.
Rameslmi, "Options for Handling Vent Gases in Sulfur Plants," Worley Parsons, Resources and Energy, available on or before Aug. 2017, 40 pages.
PCT International Search Report and Written Opinion in International Appln. No. PCT/US2019/032439, dated Aug. 14, 2010, 12 pages.

\* cited by examiner

PURIFICATION OF GASES CONTAINING SULFUR COMPOUNDS

CLAIM OF PRIORITY

This application is a continuation of and claims the benefit of priority to U.S. patent application Ser. No. 16/413,367, filed on May 15, 2019, which claims the benefit of U.S. Provisional Application Ser. No. 62/672,301, filed on May 16, 2018, the entire contents of which is hereby incorporated by reference.

TECHNICAL FIELD

This specification relates to operating industrial facilities, for example, a refinery or other industrial facilities that process crude oil and produce sulfur as a byproduct.

BACKGROUND

After raw hydrocarbons are extracted from a reservoir, the hydrocarbons can be refined to produce commercial fuels and other products. Hydrocarbon refining processes are chemical engineering processes used in refineries to transform raw hydrocarbons into the various products, for example, liquefied petroleum gas (LPG), gasoline, kerosene, jet fuel, diesel oils, fuel oils, and other products. Refineries are large industrial complexes that involve many different processing units and auxiliary facilities, for example, utility units, storage tanks, and other auxiliary facilities. Each refinery can have its own unique arrangement and combination of refining processes determined, for example, by the refinery location, desired products, economic considerations, or other factors.

Hydrocarbons extracted from a reservoir can contain various impurities. Hydrocarbons that are contaminated with significant amounts of sulfur compounds, such as hydrogen sulfide, is considered sour, while hydrocarbons that are contaminated with little or negligible amounts of sulfur compounds is considered sweet. Hydrogen sulfide, in particular, is highly poisonous, corrosive, and flammable. Therefore, the presence and handling of hydrogen sulfide is not only an operational concern (with respect to equipment and piping corrosion) but also a safety concern. The hydrocarbon refining processes can include processes that remove such impurities from the raw hydrocarbons, for example, before the hydrocarbons are transformed into the various products mentioned previously. Many refineries also include sulfur recovery processes that convert hydrogen sulfide (removed from the hydrocarbons) into elemental sulfur, which can be stored and subsequently sold on the market.

SUMMARY

The present disclosure describes technologies relating to purifying gases that contain sulfur compounds.

Certain aspects of the subject matter described here can be implemented as a system including a purification unit configured to process a vapor stream including sulfur dioxide. The purification unit includes an inlet at or near a bottom of the purification unit. The inlet is configured to allow the vapor stream to enter the purification unit. The purification unit includes a steam coil configured to circulate steam and provide a source of heat. The purification unit includes a packed bed. The purification unit includes a tray above the packed bed, and the tray is configured to accumulate sulfur. The purification unit includes an absorber section above the tray, and the absorber section is configured to remove at least a portion of the sulfur dioxide from the vapor stream. The purification unit includes an outlet at or near a top of the purification unit. The outlet is configured to allow an effluent with a lower sulfur dioxide content than the vapor stream to exit the purification unit. The system includes a sulfur tank including a vent line in fluid communication with the inlet. The vent line is configured to allow vapor to flow from the sulfur tank to the purification unit.

This, and other aspects, can include one or more of the following features. The packed bed can include structured packing, random packing, or combinations of both. The packed bed can include a wire mesh and rings. Each ring can have a length and a diameter, and the length can be approximately equal to the diameter. The absorber section can include a bed of catalyst having a honeycomb structure. The steam coil can be configured to maintain a temperature within the purification unit at approximately 180 degrees Celsius (° C.). The purification unit can include a sulfur drain configured to allow accumulated sulfur flow from the tray to exit the purification unit. The system can include electric tracing, steam tracing, or combinations of both to maintain in the vent line and the sulfur drain, a sufficiently high temperature to prevent solidification of sulfur.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

Molten sulfur (that is, sulfur in liquid form) can contain compounds such as hydrogen sulfide ($H_2S$) and sulfur dioxide ($SO_2$). $H_2S$ is flammable, and both $H_2S$ and $SO_2$ are toxic and can potentially accelerate corrosion of various materials in the presence of water. Molten sulfur storage tanks that vent directly to the atmosphere contribute to the operating plant emissions and can additionally expose personnel to these harmful components. Reducing emissions of such sulfur containing compounds is desirable, especially as emissions standards across the world become increasingly stringent. This specification describes a method for safely diverting a molten sulfur storage tank vent to a sulfur recovery unit in order to lower $SO_2$ emissions and increase sulfur recovery. The subject matter described in this specification can be implemented in particular implementations, so as to realize one or more of the following advantages. By venting directly to a sulfur recovery unit, sulfur containing compounds and heat can be removed from the vent gas before being expelled to the atmosphere. The sulfur recovery process cleans the vent gas before release to the atmosphere and effectively lowers the amount of emissions and atmospheric pollution. Therefore, risk of exposing personnel to harmful sulfur-containing compounds, such as $H_2S$ or $SO_2$, can be reduced.

Figure 1:
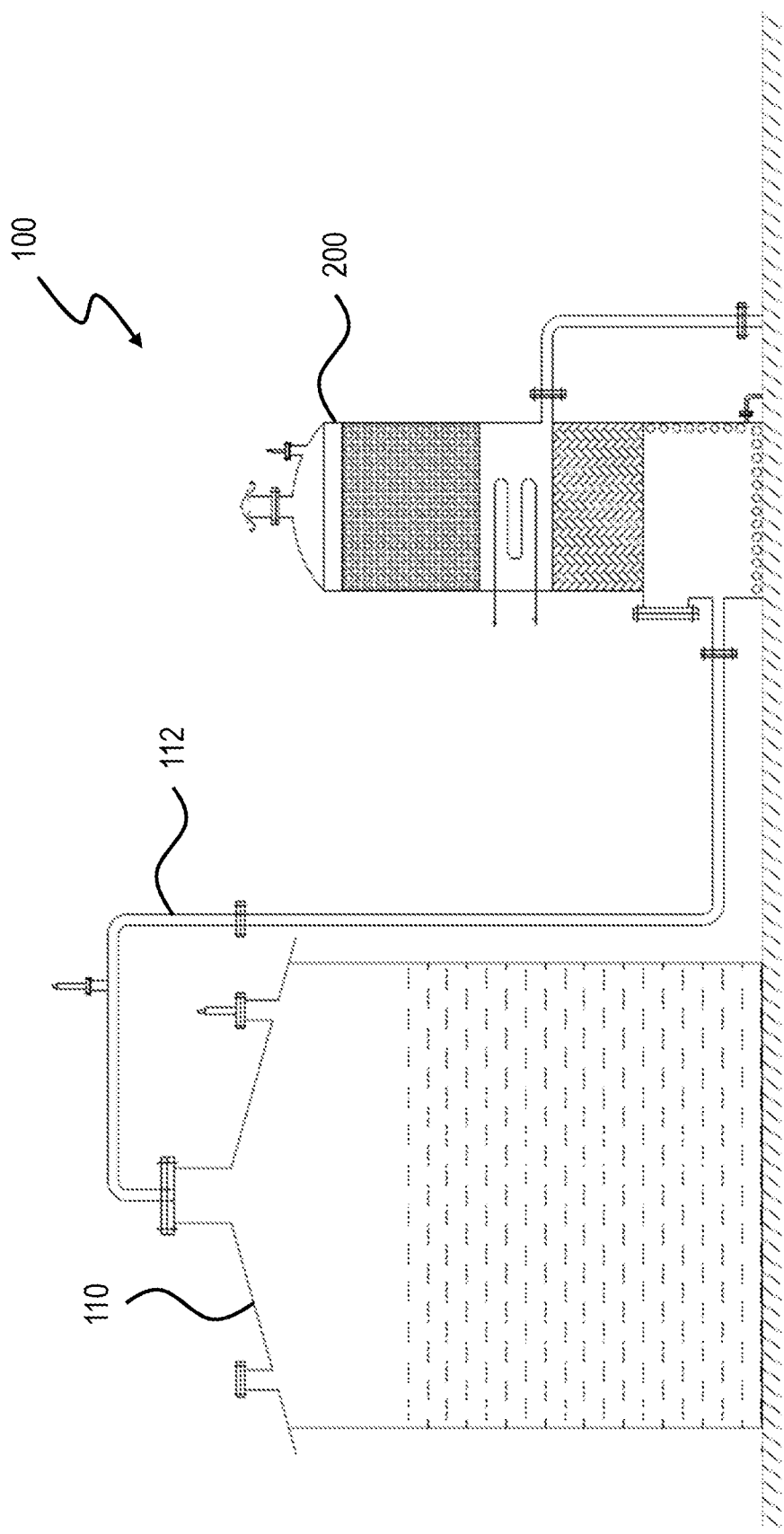
FIG. 1 is a schematic diagram of an example sulfur fume purification system.

FIG. 1 shows an example sulfur fume purification system 100. The sulfur fume purification system 100 includes a sulfur tank 110, a purification unit 200, and a vent line 112 connecting the sulfur tank 110 to the purification unit 200. The sulfur tank 110 can hold a volume of sulfur in liquid form (also referred as molten sulfur). The sulfur tank 110 can include a heat source to maintain a temperature sufficiently high to keep the sulfur in the tank 110 in liquid form (that is, prevent the sulfur in the tank 110 from solidifying). The heat source can be, for example, a steam coil submerged in the molten sulfur inside the tank 110, an external steam jacket lining the wall of the tank 110, or a combination of these. For example, the heat source can maintain a temperature of approximately 150 degrees Celsius (° C.) to approximately 160° C. within the tank 110. In this specification, "approximately" means a deviation or allowance of up to 10 percent (%) and any variation from a mentioned value is within the tolerance limits of any machinery used to manufacture the part. The sulfur tank 110 can also include insulation to mitigate or prevent heat loss from the tank 110 to the surrounding environment. The sulfur tank 110 can operate at a pressure slightly higher than atmospheric pressure, such that vapor can flow from the sulfur tank 110, through the purification unit 200, and out to the atmosphere. The operating pressure of the vapor space of the sulfur tank 110 can be the vapor pressure of the molten sulfur in the tank 110. In some implementations, the sulfur tank 110 normally operates at a pressure in a range between atmospheric pressure and 0.5 pounds per square inch gauge (psig).

In the presence of oxygen, the sulfur in the tank 110 can expel sulfur dioxide into the vapor space of the tank 110. In the case where hydrogen sulfide is dissolved in the liquid sulfur, hydrogen sulfide can also escape from the sulfur into the vapor space of the tank 110. The vent line 112 can be connected to an outlet nozzle located on the roof of the tank 110. Vapor from the tank 110 can exit through the vent line 112 and flow to the purification unit 200. The vent line 112 can include heat tracing, such as electric tracing, steam tracing, or a combination of both to maintain a temperature within the vent line 112 that is sufficiently high to prevent solidification of sulfur. For example, the heat tracing can maintain a temperature of approximately 150° C. to approximately 160° C. within the vent line 112.

Figure 2:
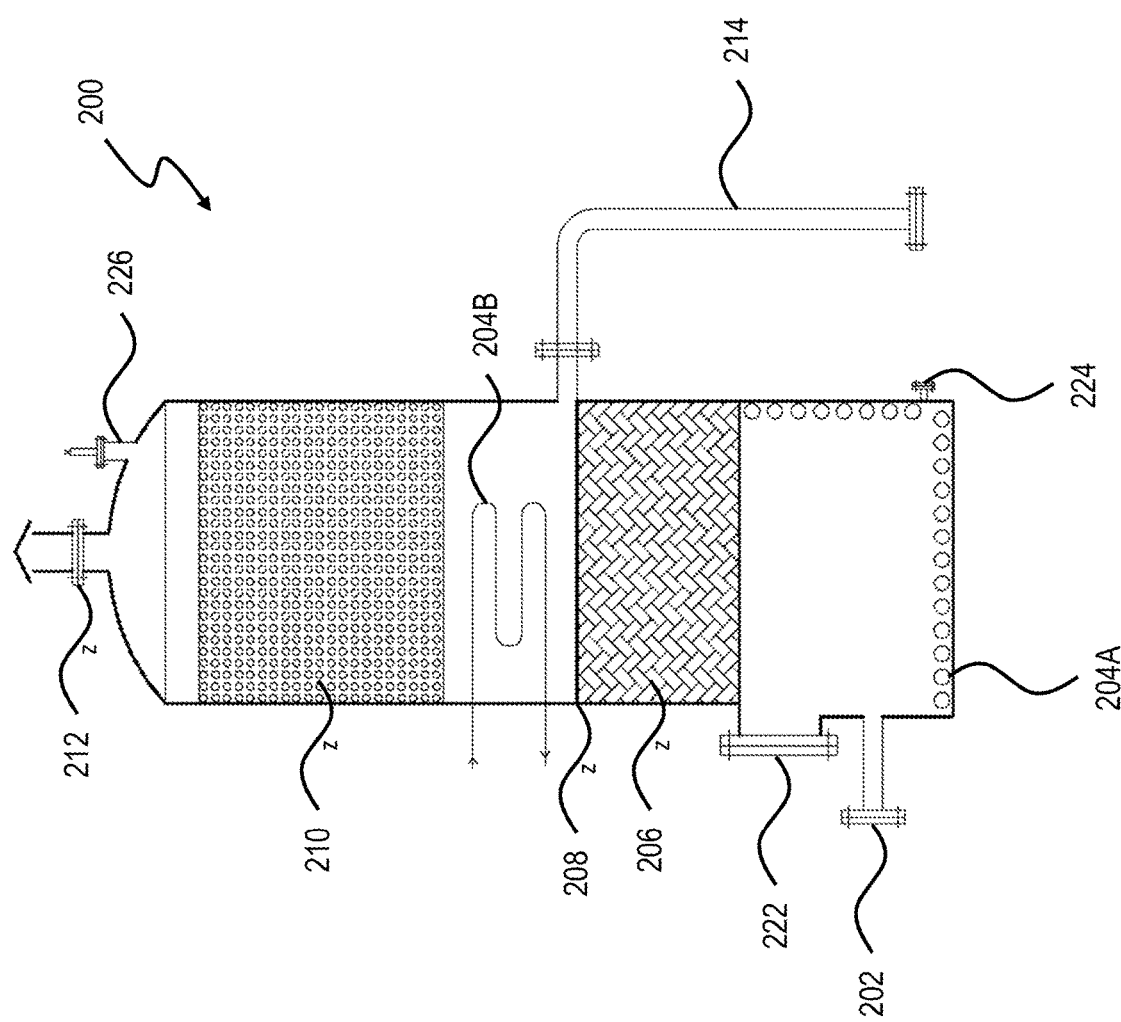
FIG. 2 is a schematic diagram of an example purification unit, which is a part of the sulfur fume purification system of FIG. 1.

FIG. 2 shows an example purification unit 200, which is part of the sulfur fume purification system 100 shown in FIG. 1. The purification unit 200 includes an inlet 202, a steam coil 204, a packed bed 206, a tray 208, an absorber section 210, and an outlet 212. The inlet 202 can be connected to the vent line 112, such that vapor can flow from the tank 110 and enter the purification unit 200. The purification unit 200 can also include a drain (214 and 224), a manhole 222, and a pressure safety valve (PSV, also referred as a relief valve) 226. In some implementations, the purification unit 200 includes multiple steam coils (204A, 204B). One steam coil (204A) can be located near the bottom of the purification unit 200, and another steam coil can (204B) can be located near the middle of the purification unit 200. Steam can be circulated through the steam coils 204A and 204B to provide a source of heat to the purification unit 200. Under operation, the steam coils (204A and 204B) can maintain a temperature within the purification unit 200 that is sufficiently high to prevent solidification of sulfur. The operating temperature of the purification unit 200 can be higher than the operating temperature of the tank 110 to account for heat losses. For example, under operation of the steam coils 204A and 204B, the purification unit 200 can operate at a temperature of approximately 180° C. Like the tank 110 shown in FIG. 1, the purification unit 200 can optionally include external steam jacketing, insulation, or a combination of both to maintain the desired temperature and to prevent or mitigate heat loss from the purification unit 200. Heat insulation can also be provided on the vent line 112 and any or all sections of the purification unit 200.

The packed bed 206 can include random packing, such as glass Raschig rings or other packing material. Raschig rings are pieces of tube that are approximately equal in length and diameter. The packed bed 206 can also include structured packing, such as wired mesh packing or other structured packing. The packed bed 206 can be located above the steam coil 204A within the purification unit 200. The packed bed 206 can force fluids to take complicated, torturous paths as the fluids flow through the purification unit 200, thereby creating increased surface area for interaction (that is, contact) between different phases (for example, liquid sulfur and vapor $SO_2$) that exist within the purification unit 200. The height of the packed bed 206 can depend on a calculated or predicted rate of $SO_2$ emissions from the tank 110. Sulfur can be carried by (that is, flow with) the vapor flow from the tank 110 through the vent line 112 to the purification unit 200. The packed bed 206 can cause the sulfur to be filtered or fall out of the vapor flowing through the purification unit 200, and the sulfur can collect at the bottom of the purification unit 200 and subsequently drained out using drain 224.

Figure 3:
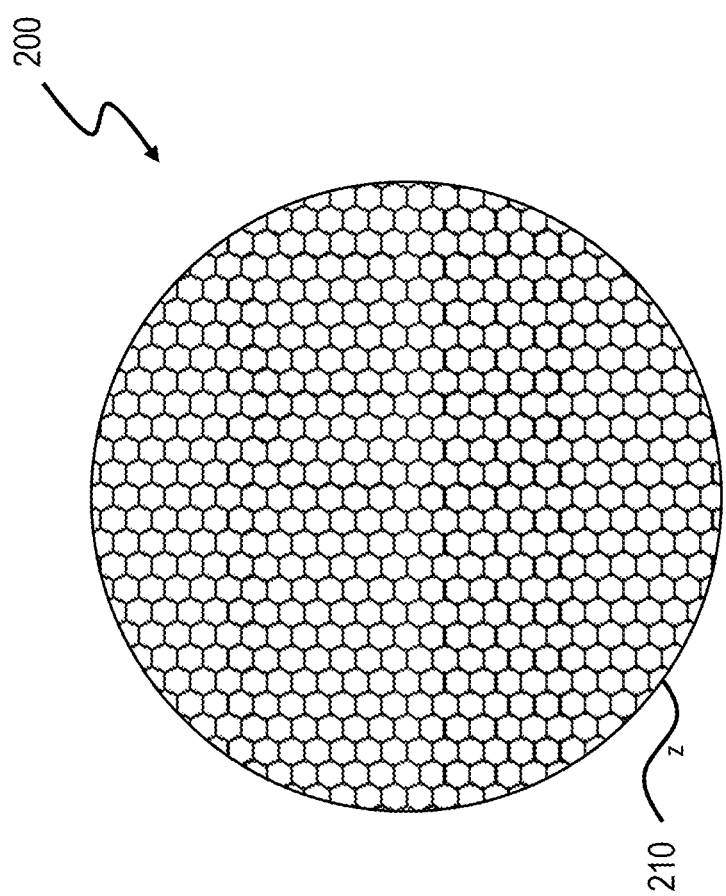
FIG. 3 is a cross-sectional view of an example absorber section, which is a part of the purification unit of FIG. 2.

The absorber section 210 can be located above the tray 208, near the top of the purification unit 200. The absorber section 210 can remove at least a portion of the $SO_2$ and $H_2S$ from the vapor stream. FIG. 3 shows a cross-sectional view of an example absorber section 210. The absorber section 210 can include a bed of catalyst, for example, a bed of ceramic catalyst. As shown in FIG. 3, the ceramic catalyst can have a honeycomb structure and can filter $SO_2$ and $H_2S$ and absorb heat. As vapor flows through the absorber section 210, $SO_2$ and $H_2S$ in the vapor can be removed. In some cases, the vapor carries some sulfur. Referring back to FIG. 2, the tray 208 above the packed bed 206 can collect sulfur (that is, liquid sulfur can accumulate on the tray 208), and the accumulated sulfur can be drained out using drain 214. As one example, the drains 214 and 224 can discharge fluid to a sulfur pit. The drains 214 and 224 can (like the vent line 112 shown in FIG. 1) include heat tracing, such as electric tracing, steam tracing, or a combination of both to maintain a temperature within the drains (214, 224) that is sufficiently high to prevent solidification of sulfur. For example, the heat tracing can maintain a temperature of approximately 180° C. within the drains 214 and 224.

The inlet 202 can allow fluid (for example, vapor from the tank 110 flowing through the vent line 112) to enter the purification unit 200. The inlet 202 can be located near the bottom of the purification unit 200. Vapor can travel up past the steam coil 204A, through the packed bed 206, past the tray 208, past the steam coil 204B, through the absorber section 210, and then exit through the outlet 212 (located at the top of the purification unit 200) with reduced $SO_2$ content. Therefore, the effluent from the purification unit 200 can be considered to be cleaner than the vapor entering the purification unit 200 (that is, the vapor from the tank 110). The manhole 222 can be opened, so that an operator can enter the purification unit 200, for example, to perform maintenance on the various sections of the purification unit 200. The PSV 226 can open to relieve fluid from the purification unit 200 in the case that the pressure in the purification unit 200 rises above a threshold pressure (for example, the design pressure of the purification unit 200) for any reason. Therefore, the PSV 226 provides overpressure protection to the purification unit 200. Additional PSVs can be installed in the sulfur fume purification system 100 to provide overpressure protection, such as on the tank 110 and on the vent line 112.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

The invention claimed is:

1. A purification unit configured to process a vapor stream comprising sulfur dioxide, the purification unit comprising:
   a steam coil configured to circulate steam and provide a source of heat to a vapor stream comprising sulfur dioxide, the vapor stream received through an inlet of the purification unit;
   a packed bed;
   a tray above the packed bed, the tray configured to accumulate sulfur;
   an absorber section above the tray, the absorber section configured to remove at least a portion of the sulfur dioxide from the vapor stream; and
   an outlet at or near a top of the purification unit, the outlet configured to allow an effluent with a lower sulfur dioxide content than the vapor stream to exit the purification unit.

2. The purification unit of claim 1, wherein the packed bed comprises structured packing, random packing, or combinations thereof.

3. The purification unit of claim 1, wherein the packed bed comprises a wire mesh and rings, each ring comprising a length and a diameter, the length being approximately equal to the diameter.

4. The purification unit of claim 1, wherein the absorber section comprises a bed of catalyst having a honeycomb structure.

5. The purification unit of claim 1, wherein the steam coil is configured to maintain a temperature within the purification unit at approximately 180 degrees Celsius (° C.).

6. The purification unit of claim 1, wherein the purification unit further comprises a sulfur drain configured to allow accumulated sulfur flow from the tray to exit the purification unit.

7. The purification unit of claim 6, further comprising electric tracing, steam tracing, or combinations thereof to maintain in the vent line and the sulfur drain, a sufficiently high temperature to prevent solidification of sulfur.

8. The purification unit of claim 1, further comprising a manhole attached to a side of the purification unit, the manhole configured to be opened to allow an operator to enter the purification unit.

9. The purification unit of claim 1, further comprising a pressure safety valve configured to open to relieve fluid from the purification unit in response to pressure in the purification unit rising above a threshold pressure.

10. The purification unit of claim 1, wherein the steam coil is a first steam coil, wherein the purification unit comprises a plurality of steam coils including the first steam coil.

11. The purification unit of claim 10, wherein the first steam coil is located near a bottom of the purification unit and the second steam coil is located near a middle of the purification unit.

12. The purification unit of claim 10, wherein the plurality of steam coils maintain a temperature within the purification unit that is sufficiently high to prevent solidification of sulfur.

13. The purification unit of claim 1, further comprising steam jacketing to maintain temperature and prevent heat loss.

* * * * *